United States Patent
Manty et al.

(10) Patent No.: US 10,932,458 B2
(45) Date of Patent: Mar. 2, 2021

(54) BAIT HOSTING FISHING DEVICES

(71) Applicants: Henry J Manty, Templeton, MA (US); Steve Levine, Westminster, MA (US)

(72) Inventors: Henry J Manty, Templeton, MA (US); Steve Levine, Westminster, MA (US)

( * ) Notice: Subject to any disclaimer, the term of this patent is extended or adjusted under 35 U.S.C. 154(b) by 386 days.

(21) Appl. No.: 15/650,858

(22) Filed: Jul. 15, 2017

(65) Prior Publication Data

US 2018/0014519 A1    Jan. 18, 2018

Related U.S. Application Data

(60) Provisional application No. 62/363,666, filed on Jul. 18, 2016.

(51) Int. Cl.
| | | |
|---|---|---|
| *A01K 97/02* | (2006.01) | |
| *A01K 85/00* | (2006.01) | |
| *A01K 95/00* | (2006.01) | |
| *A01K 85/01* | (2006.01) | |

(52) U.S. Cl.
CPC .............. *A01K 97/02* (2013.01); *A01K 85/00* (2013.01); *A01K 85/01* (2013.01); *A01K 95/00* (2013.01)

(58) Field of Classification Search
CPC ........ A01K 85/00; A01K 85/01; A01K 85/02; A01K 97/02; A01K 95/00
USPC ...................... 43/4.5, 44.99, 42.06
See application file for complete search history.

(56) References Cited

U.S. PATENT DOCUMENTS

| | | | | |
|---|---|---|---|---|
| 1,558,249 A | * | 10/1925 | De Zeng | A01K 85/14 43/42.34 |
| 1,814,571 A | * | 7/1931 | Rodgers | A01K 85/02 43/42.4 |
| 2,632,276 A | * | 3/1953 | Hale | A01K 85/14 43/42.06 |
| 2,713,744 A | | 7/1955 | Strausser, Sr. | |
| 2,797,517 A | | 7/1957 | Eriksen | |
| 2,846,805 A | * | 8/1958 | Waitzman | A01K 85/16 43/42.06 |
| 2,968,113 A | * | 1/1961 | Multanen | A01K 85/01 43/42.06 |
| 3,192,662 A | * | 7/1965 | Hoyle | A01K 95/00 43/44.91 |
| 3,434,230 A | | 3/1969 | Littlefield | |
| 3,500,576 A | * | 3/1970 | Ostrom | A01K 85/16 43/43.12 |
| 3,688,430 A | | 9/1972 | Balch | |
| 3,744,174 A | * | 7/1973 | Lund | A01K 85/16 43/42.06 |

(Continued)

FOREIGN PATENT DOCUMENTS

| | | |
|---|---|---|
| EP | 2692231 A1 | 5/2014 |
| JP | 2002272337 A | 9/2002 |

(Continued)

*Primary Examiner* — Darren W Ark
*Assistant Examiner* — Brady W Frazier
(74) *Attorney, Agent, or Firm* — Luis Figarella (57) ABSTRACT

A submersible fishing apparatus that contains one or more cavities along the fascia of its body, each said cavity comprising a temporary individual housing for bait or fish-attracting material (including such bait as 'stink bait'), so that a fisherman may easily apply and refresh the bait/attractant between uses, thus allowing a fisherman to easily attract fish with minor effort. The apparatus includes jigs, lures, weights, sinkers, etc.

3 Claims, 6 Drawing Sheets

(56) References Cited

U.S. PATENT DOCUMENTS

| | | | | |
|---|---|---|---|---|
| 3,893,255 A * | 7/1975 | Hicks | A01K 83/06 | 43/41 |
| 4,441,275 A * | 4/1984 | Leszkiewicz | A01K 85/14 | 43/42.06 |
| 4,751,788 A * | 6/1988 | Mattison | A01K 85/01 | 43/17.6 |
| 5,555,670 A | 9/1996 | Troutman, Jr. | | |
| 5,737,867 A * | 4/1998 | Tsutsumi | A01K 85/16 | 43/17.6 |
| 5,953,849 A * | 9/1999 | Boucher, Jr. | A01K 85/00 | 43/42.08 |
| 6,079,146 A * | 6/2000 | Larsen | A01K 85/01 | 43/42.06 |
| 6,176,033 B1 * | 1/2001 | Latwesen | A01K 83/00 | 424/410 |
| 6,516,554 B1 | 2/2003 | Page et al. | | |
| 7,305,791 B2 | 12/2007 | Patton | | |
| 7,497,045 B1 * | 3/2009 | Crowe | A01K 85/00 | 43/42 |
| 7,621,072 B2 * | 11/2009 | Brasseur | A01K 95/00 | 43/42.34 |
| 7,716,868 B2 * | 5/2010 | Emmott | A01K 85/16 | 43/42.06 |
| 9,125,390 B1 * | 9/2015 | Kreamalmyer | A01K 85/00 | |
| 2006/0005456 A1 | 1/2006 | Harris et al. | | |
| 2007/0163165 A1 * | 7/2007 | Castro | A01K 85/00 | 43/42.06 |
| 2007/0199235 A1 | 8/2007 | Yu | | |
| 2010/0071252 A1 * | 3/2010 | Woodley | A01K 85/00 | 43/42.35 |
| 2010/0115821 A1 * | 5/2010 | Carlson | A01K 85/16 | 43/4.5 |
| 2014/0259866 A1 | 9/2014 | Jones | | |
| 2017/0000095 A1 * | 1/2017 | Huang | A01K 85/01 | |

FOREIGN PATENT DOCUMENTS

| | | | | |
|---|---|---|---|---|
| JP | 2005269934 A * | 10/2005 | | |
| RU | 2128433 C1 | 3/1996 | | |
| WO | WO 86/00499 A | 1/1986 | | |
| WO | WO-2004032618 A1 * | 4/2004 | | A01K 97/02 |
| WO | WO 2005/077163 A | 8/2005 | | |

\* cited by examiner

BAIT HOSTING FISHING DEVICES

CROSS-REFERENCE TO RELATED APPLICATIONS

This application claims priority to U.S. Provisional patent application Ser. No. 62/363,666 titled "Stink Bait Emitting Fish Weight", filed on Jul. 18, 2016, the disclosure of which is herein incorporated by reference in its entirety.

PATENTS CITED

The following documents and references are incorporated by reference in their entirety, Troutmane, Jr. (U.S. Pat. No. 5,555,670), Strausser, Sr. (U.S. Pat. No. 2,713,744), Patton (U.S. Pat. No. 7,305,791), Temple EP 2,292,090, Jones (U.S. Pat. Pub. No. 2014/0259866), Page et al (U.S. Pat. No. 6,516,554), Yu (U.S. Pat. Pub. No. 2007/0199235), Harris et al (U.S. Pat. Pub. No. 2006/0005456), Quan (JP 2002272337), Verocel (WO86/00499) and Laczko (WO 2005/077163).

FIELD OF THE INVENTION

The present invention relates to submersible apparatus having a cavity for receiving bait or fish-attracting material. More specifically, the present invention relates to a fish weigh or lure assembly that is connected to a fish hook, capable of placing said hook under water and attracting fish to the area of said hook.

DESCRIPTION OF THE RELATED ART

For years it has been a common practice to use scents in hooks and lures when fishing. While many lures speak of having 'permanent' scents, fishermen (herein describing both male and female fishermen), have learned through experience that the best such attractants are disposable ones, those that can be applied and refreshed as required. One such attractant is commonly referred as stink bait.

Stink bait is exactly what it sounds like: a stinky, putty-like material used as bait and/or attractant in catching fish. You can purchase stink bait at bait shops or sporting goods stores, or make it yourself using items from the grocery store. Some stink bait consists of just one or two ingredients, whose strong odors seem to draw fish. In effect, what smells awful to the fisherman apparently smells pretty good to the fish, so the stinkier the bait, the better. In effect, you have the need to bring and keep near the hook, a putty or paste like composition.

Many multi part devices have been created, which require the addition of the fish weight. What is required, is a fish weigh or lure capable of storing and dispensing the stink bait (as well as any other similar and suitable bait, attractant or lure), while providing the fisherman with an easy to refresh/reload assembly.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a fishing accessory comprising a monolithic body having one or more line-wrapping openings, said line-wrapping openings securable to a fishing implement and wherein there are one or more bait hosting cavities or deep indentations along the outer surface of said monolithic body. In another aspect, said monolithic body is a fishing weight and one or more of said bait hosting cavities or deep indentations do not completely cross said monolithic body. In yet another aspect one or more of said bait hosting cavities has a lip at one or more of said cavity or deep indentation edge. In another aspect said monolithic body is a fishing weight and one or more of said bait hosting cavities or deep indentations completely cross said monolithic body. In yet another aspect one or more of said bait hosting cavities has a lip at one or more of said cavity or deep indentation edge. In another aspect said monolithic body is a fishing lure or jig and one or more of said bait hosting cavities or deep indentations do not completely cross said monolithic body. In another aspect said monolithic body is a fishing lure or jig and said one or more bait hosting cavities or deep indentations completely cross said monolithic body along one or more of said lure's crest, bottom and/or side. In yet another aspect said one or more bait hosting cavities or deep indentations have grooves.

In one aspect, the invention is about a fishing accessory comprising a monolithic body having one or more line-wrapping openings, said line-wrapping openings securable to a fishing implement and wherein said body is hollow and has at least one opening communicating the outside with said monolithic interior. In another aspect said monolithic body is made of a flexible and/or semi-flexible material. In yet another aspect said monolithic body is made of a rigid material, opening at both ends.

In one aspect the invention is about a fishing kit comprising one or more containers of fishing bait; and a fishing lure, weight or sinker comprised of: a monolithic body having one or more line-wrapping openings, said line-wrapping openings securable to a fishing implement, wherein there are one or more bait hosting cavities or deep indentations along the outer surface of said monolithic body.

Other features and advantages of the present invention will become apparent upon examining the following detailed description of an embodiment thereof, taken in conjunction with the attached drawings.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Figure 1A:
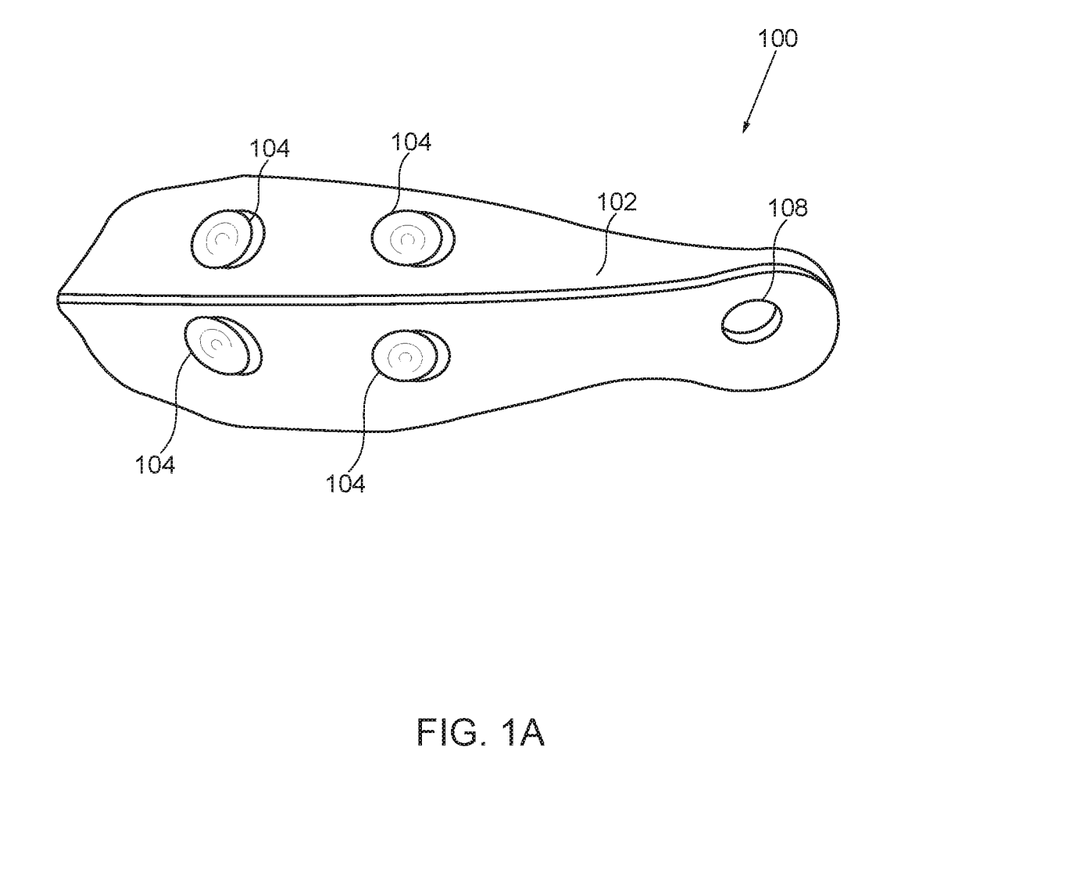
FIGS. 1A, 1B and 2 show illustrations of a fascia-openings bait hosting fishing weights/sinkers, according to exemplary embodiment of the invention.
Figure 1B:
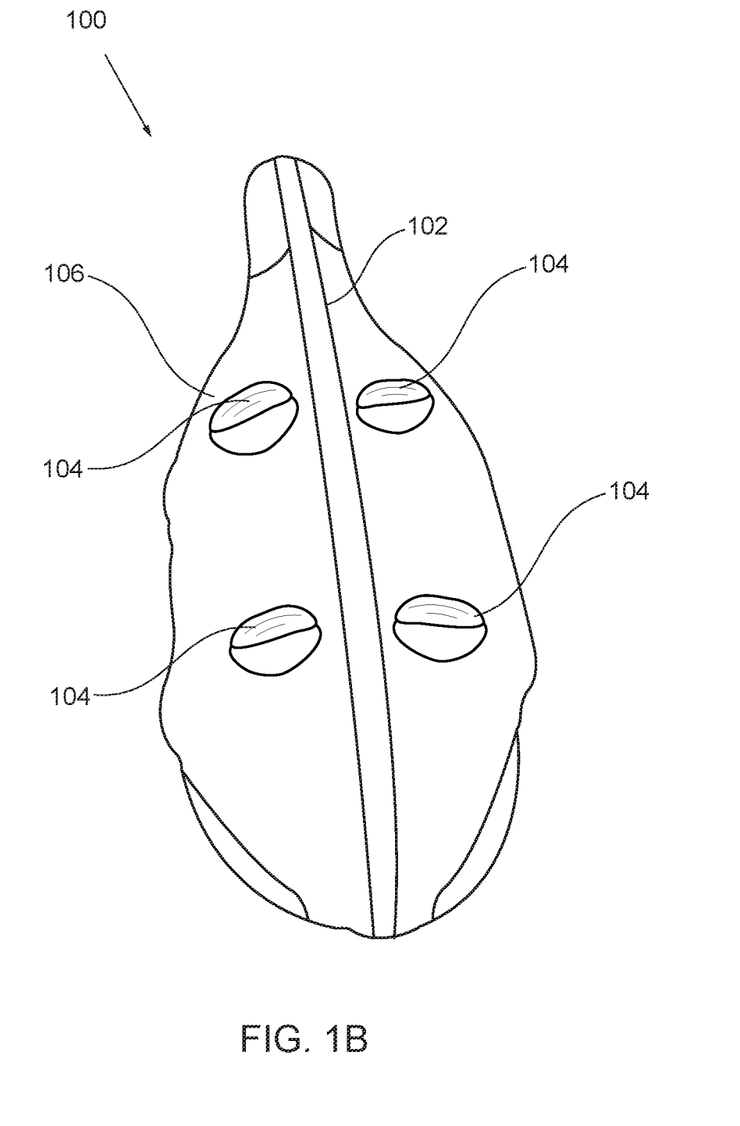
Figure 2:
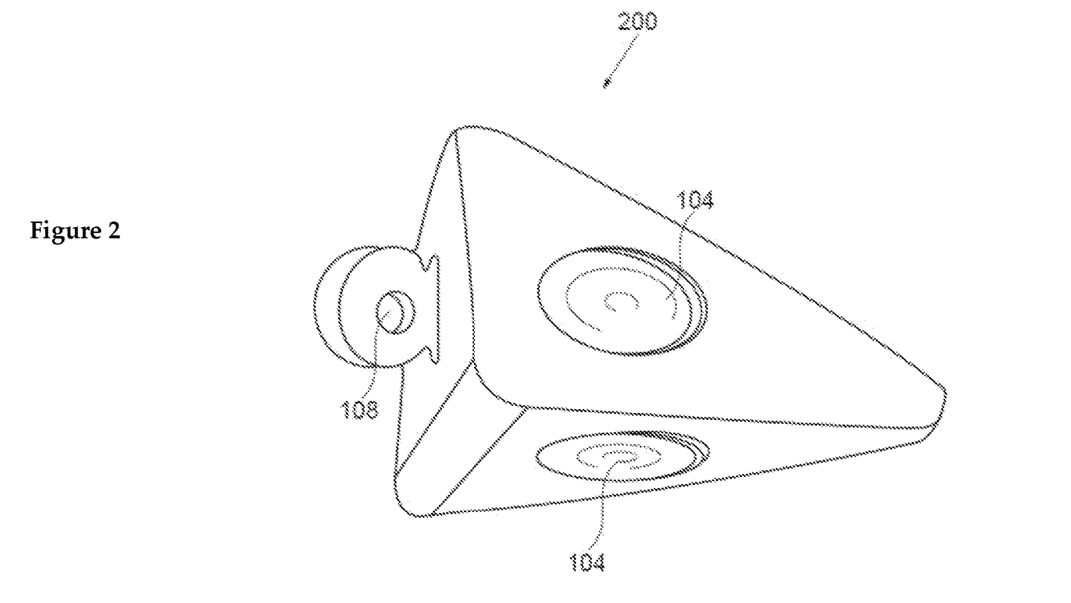

Referring to FIGS. 1A-1B and 2, we see 100 an embodiment of a fishing weight 102 painted a number of colors (commonly referred also as a sinker). This is typically placed at/near the end of the fishing line, to ensure the hook and/or bait 'floats' a certain distance above the bottom. The sinker is typically made of a monolithic body 100 having one or more loops or openings 108 in which to wrap or tie the fishing line to the other fishing components (e.g. fishing pole, hooks, etc.).

To host the bait (herein referring to include both stink bait and/or other similar such fish attractant), one or more deep indentations or cavities 104 are made along the fascia, face or outer surface of the weight 102. In one embodiment, these cavities 104 are made as partial indentations, that is, they do not cross the body of the weight 102 but are gouges or indentations along the outer surface of the weight 102, being comprised of one or more cavities 104 along the one or more facets of the weight 102. As we see in FIG. 2, it must be noted that one or more of said openings or cavities 104 may be located anywhere along the face or walls of the weight/sinker 200.

In an alternate embodiment, a mound or lip 106 may be formed along one or more of the edges of the cavity 104. Such a lip may have advantages for the fisherman placing the bait within the opening, as he/she 'wipes' the bait into said opening 104.

Figure 3:
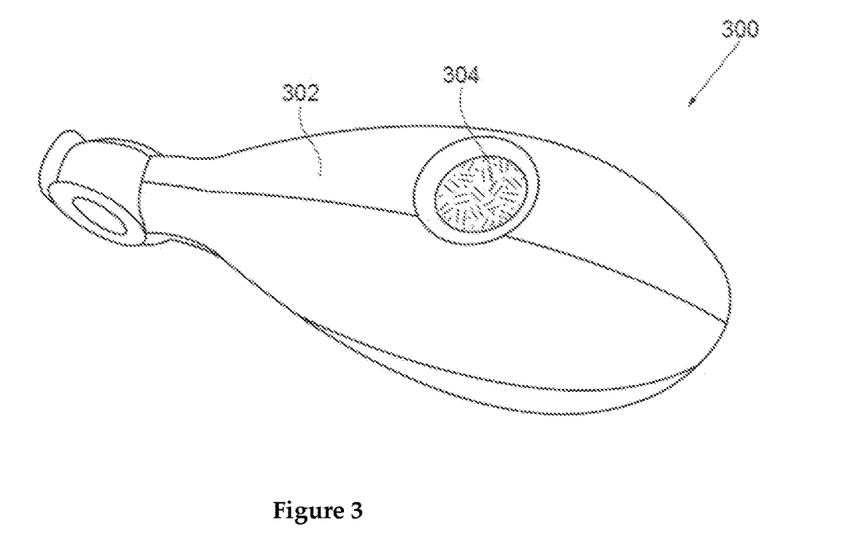
FIGS. 3-4 show illustrations of a through-hole bait hosting fishing weights/sinkers, according to exemplary embodiment of the invention.
Figure 4:
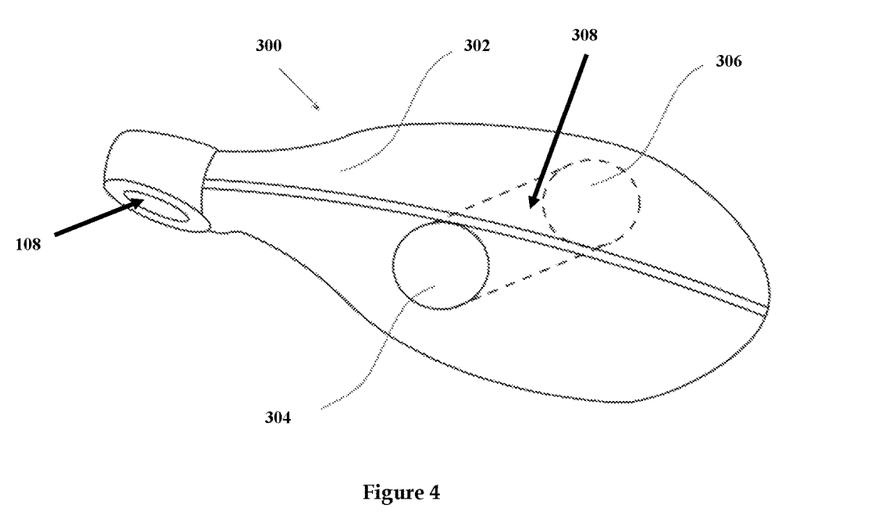

Referring to FIGS. 3-4 we see an alternate embodiment 300 where there is a through hole 308 (with openings 304/306 at either end of the weight/sinker) that goes completely through the monolithic body of the weight 302. This means the opening 304 on one side exits at the other side 306 of the weight/sinker 302. The value of such an opening relies in the fact that the user may stuff the opening with bait on one end, and force the 'old stink bait or bait' to come out the other, and or be able to push a cleaner implement (say a pen-knife blade or pipe cleaner tube) into the opening to vacate the old bait. We must note that either the cavity 104 or through hole 308 solutions may be accomplished with a monolithic fish weight, not being exclusive of each other.

In another embodiment of the fishing lure, the body of the lure is partially or completely hollow, constructed of a material that is heavy enough to sink or float in water (as the other weights/sinkers discussed above, for use in both fresh and/or saltwater), even when the internal cavity within the weight is partially or completely filled with bait. Such an embodiment would allow the bait material to act (i.e. emit it's 'stink' or similar fish attractant/luring material into the water) through the one or more holes along said weight's surface, with tying loops along the top and/or bottom of the fish weight.

In another embodiment the weight/sinker assembly is made of an open sleeve (made of plastic or flexible material, picture a drinking straw, but sealed at one end and more malleable/flexible), wherein the user may 'ram' the bait, then (before or after the stink bait) have one or more weights introduced. Through either the natural openings at either end, and/or one or more openings along the body length, the connection to the fishing line may be done. Because the device is flexible, it may be easily cleaned through squeezing the object body (thus ejecting both the old bait and the weights).

All the devices discussed herein may be made of a number of materials, including combinations of metals (ferrous and/or non-ferrous, such as steel, iron, aluminum, lead). When making the device of metal, the cavities may be molded or mechanically cored. Additionally, the parts may be made out of polymers, plastics and thermoplastics, including nylon, ABS ("acrylonitrile butadiene styrene") or other such moldable plastics. The flexible devices may be moldable plastics having the cavities molded along its surface but having a heavy metal or sand core.

Figure 5:
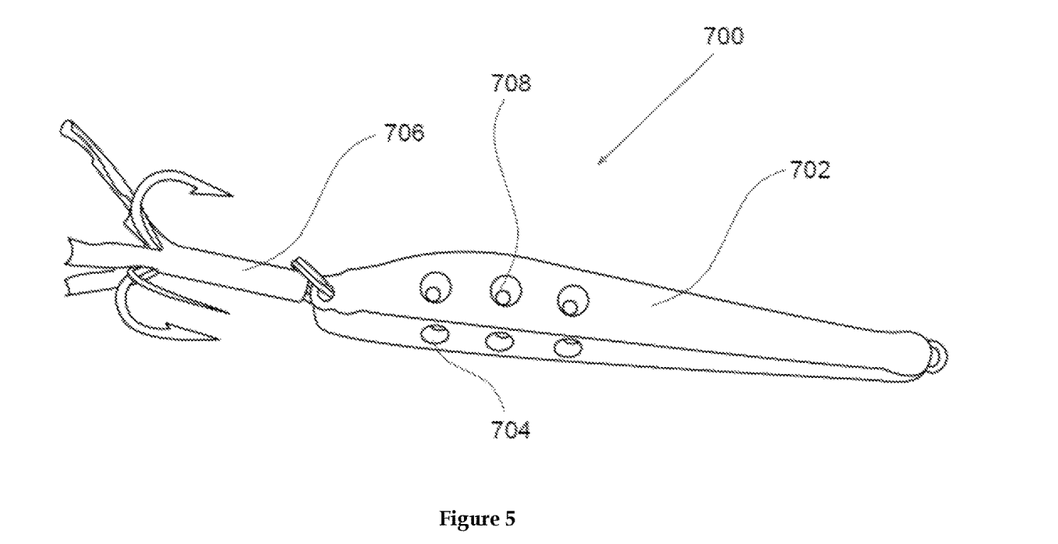
FIG. 5 shows an illustration of a fascia-opening bait hosting fishing jig or lure, according to exemplary embodiment of the invention.

In addition to weights/sinkers as discussed above, we must also discuss embodiments that combine/merge the weight/sinker bait hosting functions as described above with the functions of jigs and lures. Referring to FIG. 5 we see one such exemplary embodiment, a fish shaped jig or lure 702 with similar cavities 104 along one or more of its side, fascia or faces (704, 708). These cavities 704, 708 may be partial and/or go through the complete body. The cavities (704, 708) in the lure may be shaped as grooves, dimples and/or any other suitable form in which the bait or other color/scent/sensed attractants 706 may be impressed.

Note the arrangement 700 holds the bait, along with any other color/scent/sensed bait/feature 706 to attract fish closer to the hook(s). In such a way, it goes beyond attracting the fish through smell/taste, and into the color/vision attraction, such as those we see from the great variety of rubber worms, jigs and lures. The jig embodiment 702 in addition to holding the bait within its center, may also hold the hooks as shown.

Figure 6:
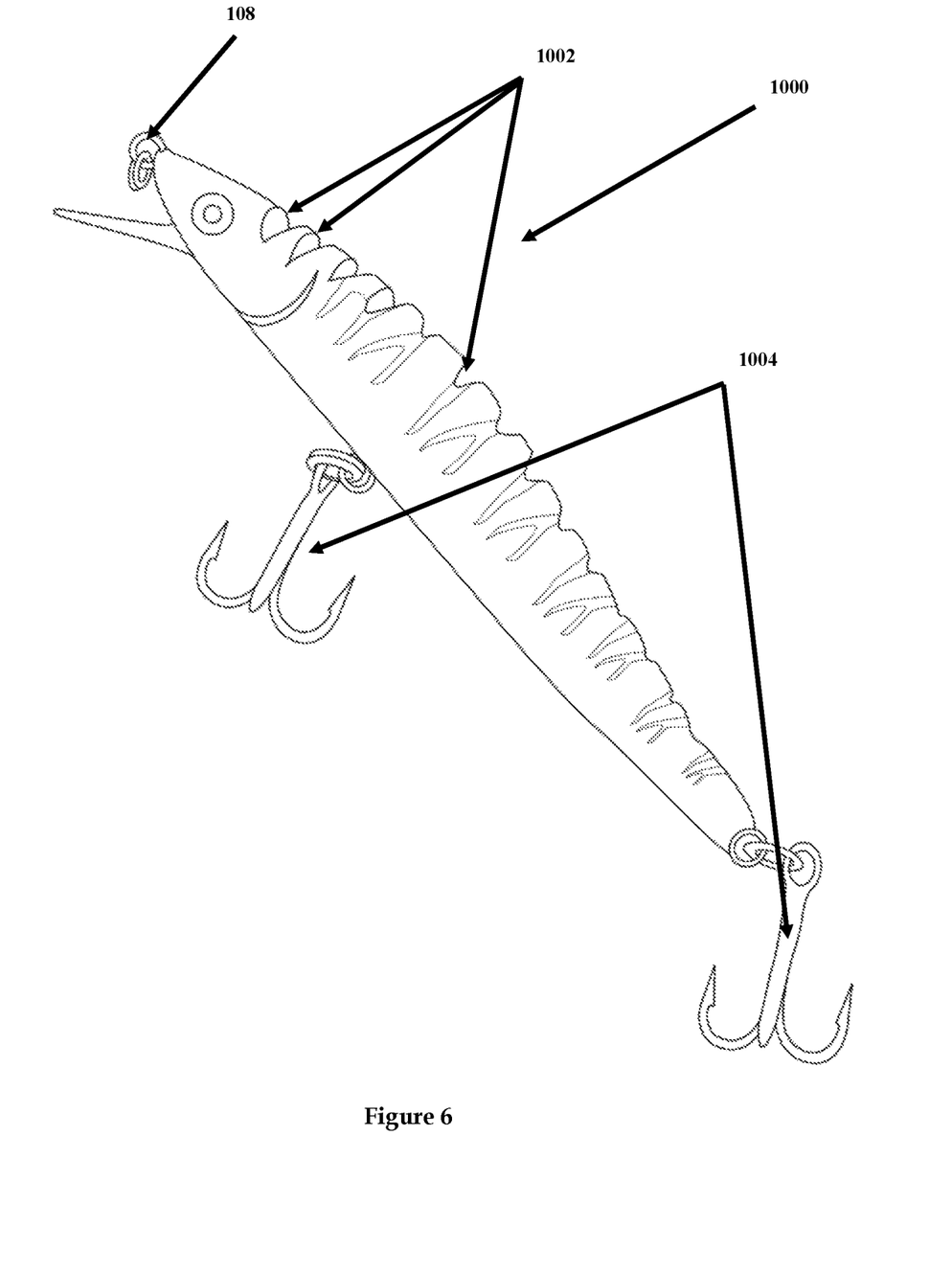
FIGS. 6-7 show illustrations of a bait hosting fishing lure, according to exemplary embodiment of the invention.
Figure 7:
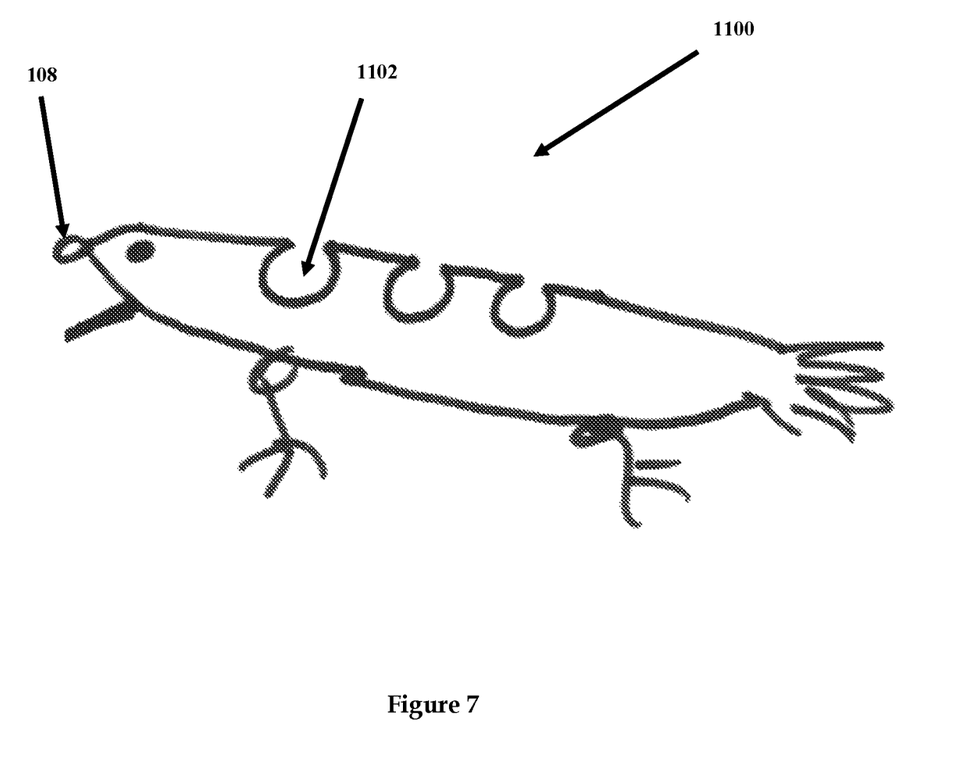

Referring to FIGS. 6-7 we see a bait hosting lure 1000 having one or more hook assemblies 1004, and one or more bait hosting openings 1002 along one or more of its surfaces. On a lure, there may be an advantage to make the bait hosting openings 1002 along the crest of the 'fish body', although any other location may be available. The openings may be partial (similar to 104), through hole (like 308), 'wide mouth' 1002 (as shown) or across the body 1100 with grooves 1102 (which helps in holding the bait longer while leaving the bait open to all three sides).

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

The invention claimed is:

1. A fishing accessory comprising:
a monolithic body having one or more line-wrapping openings at one end, said one or more line-wrapping openings securable to a fishing implement;
wherein there are one or more round deep indentations on the outer surface of said monolithic body; and
wherein one or more of said round deep indentations do not completely cross said monolithic body nor travel completely along the complete periphery of said body and have a mound protruding along the perimeter of the edge of one side of the rim of each said deep indentation, wherein said mound is shaped in an arc configuration that follows the edge of said round indentation so as to form a substantially semi-circular shape;
said monolithic body is a fishing weight.

2. A fishing accessory comprising:
a monolithic body having one or more line-wrapping openings at one end, said one or more line-wrapping openings securable to a fishing implement;
wherein there are one or more round deep indentations on the outer surface of said monolithic body;
wherein one or more of said round deep indentations do not completely cross said monolithic body nor travel completely along the complete periphery of said body and have a mound protruding along the perimeter of the edge of one side of the rim of each said deep indentation, wherein said mound is shaped in an arc configuration that follows the edge of said round indentation so as to form a substantially semi-circular shape;
said monolithic body is a fishing lure or jig.

3. A fishing kit comprising;
one or more containers of fishing bait; and
a fishing lure, weight, jig or sinker comprised of:
a monolithic body having one or more line-wrapping openings at one end, said one or more line-wrapping openings securable to a fishing implement, wherein there are one or more round deep indentations on the outer surface of said monolithic body; and
wherein one or more of said round deep indentations do not completely cross said monolithic body nor travel completely along the complete periphery of said body and have a mound protruding along the perimeter of the edge of one side of the rim of each said deep indentation, wherein said mound is shaped in an arc configuration that follows the edge of said round indentation so as to form a substantially semi-circular shape.

* * * * *